US011547091B1

(12) United States Patent
Cook

(10) Patent No.: US 11,547,091 B1
(45) Date of Patent: Jan. 10, 2023

(54) ANIMAL MOBILITY DEVICE

(71) Applicant: Thomas C. Cook, Litchfield, ME (US)

(72) Inventor: Thomas C. Cook, Litchfield, ME (US)

( * ) Notice: Subject to any disclaimer, the term of this patent is extended or adjusted under 35 U.S.C. 154(b) by 0 days.

(21) Appl. No.: 17/378,263

(22) Filed: Jul. 16, 2021

(51) Int. Cl.
*A01K 27/00* (2006.01)
*B62B 13/06* (2006.01)
*B62B 17/06* (2006.01)
*B62B 7/04* (2006.01)
*B62B 9/20* (2006.01)
*A61H 3/04* (2006.01)
*A61H 3/00* (2006.01)

(52) U.S. Cl.
CPC ........... *A01K 27/002* (2013.01); *A61H 3/04* (2013.01); *B62B 7/044* (2013.01); *B62B 9/20* (2013.01); *B62B 13/06* (2013.01); *B62B 17/061* (2013.01); *B62B 17/066* (2013.01); *A61H 2003/007* (2013.01)

(58) Field of Classification Search
CPC ........ A01K 27/002; A01K 13/00; A61H 3/04; A61H 2003/007; B62B 7/044; B62B 9/20; B62B 13/06; B62B 17/061; B62B 17/066; A61D 9/00
See application file for complete search history.

(56) References Cited

U.S. PATENT DOCUMENTS

| | | | | |
|---|---|---|---|---|
| 2,546,726 A * | 3/1951 | Creamer, Jr. | .......... | A01K 13/00 280/47.131 |
| 2,976,840 A * | 3/1961 | Hugus | .......... | A61D 9/00 119/727 |
| 3,215,117 A * | 11/1965 | Short | .......... | A01K 13/00 119/727 |
| 3,406,661 A * | 10/1968 | Parkes | .......... | A61D 9/00 119/727 |
| 3,797,849 A * | 3/1974 | Sherman | .......... | B62B 7/00 280/47.38 |
| 4,375,203 A * | 3/1983 | Parkes | .......... | A61D 9/00 119/727 |
| 4,775,161 A * | 10/1988 | Bridges | .......... | B62B 13/06 280/21.1 |
| 5,123,670 A * | 6/1992 | Chen | .......... | B62B 7/06 280/47.38 |
| 5,224,506 A * | 7/1993 | Allen | .......... | A61H 3/04 16/42 T |
| 6,095,548 A * | 8/2000 | Baechler | .......... | B62B 7/062 280/650 |
| 6,820,572 B1 * | 11/2004 | Parkes | .......... | A61D 3/00 119/728 |

(Continued)

FOREIGN PATENT DOCUMENTS

DE 10343357 B4 * 4/2017 ............... A61D 9/00
JP 2002345360 A * 12/2002

(Continued)

*Primary Examiner* — James A Shriver, II
*Assistant Examiner* — Michael T. Walsh
(74) *Attorney, Agent, or Firm* — Anthony D. Pellegrini

(57) ABSTRACT

An animal mobility device to be used with an animal who lacks full functional use of its rear legs, providing the animal with two modes of operation, with the first mode of operation being active, whereby the animal propels itself by its front legs while having its rear portion supported by the device, and with the second mode of operation being passive, whereby a human operator propels the device while the entirety of the animal is supported by the device.

24 Claims, 9 Drawing Sheets

(56) References Cited

U.S. PATENT DOCUMENTS

| | | | | |
|---|---|---|---|---|
| 9,179,646 | B2 * | 11/2015 | Shalom | A01K 15/02 |
| 10,765,087 | B1 * | 9/2020 | Massey | A61H 3/04 |
| 2010/0007104 | A1 * | 1/2010 | Bennett | A61G 5/127 |
| | | | | 280/7.15 |
| 2016/0242392 | A1 * | 8/2016 | Holzworth | A01K 15/027 |
| 2019/0209417 | A1 * | 7/2019 | Laicheng | A61H 3/04 |
| 2022/0039347 | A1 * | 2/2022 | Bishop | A01K 1/0245 |

FOREIGN PATENT DOCUMENTS

| | | | | |
|---|---|---|---|---|
| JP | 2003009704 A * | 1/2003 | | A61D 9/00 |
| JP | 4979834 B1 * | 7/2012 | | A01K 15/02 |
| WO | WO-2014154903 A1 * | 10/2014 | | B62B 1/002 |
| WO | WO-2021024967 A1 * | 2/2021 | | A61H 3/04 |

\* cited by examiner

ANIMAL MOBILITY DEVICE

BACKGROUND OF THE INVENTION

The present invention relates to mobility assist devices for animals having a disability. Specifically, the present invention relates to a combination animal wheelchair/animal stroller.

Animal wheelchairs are well known in the art. They typically are configured with a support component designed to support the rear portion of the animal, with wheels associated with that support component, and an animal engagement component to retain the device to the animal. See, e.g., U.S. Pat. No. 5,224,444, "Walking Aids for Animals" (Jul. 6, 1993), issued to Hill, et al. (the rear of the animal is placed onto a cradle attached to a pair of wheels by a frame, with a plurality of straps located at the front of the frame to secure the animal thereto); and U.S. Pat. No. 9,179,646, "Walking Aid for Disabled Four-Legged Animals" (Nov. 10, 2015), issued to Shalom (the rear support and the forward animal engagement component are integrated into a single harness assembly). These devices are intended to provide a level of independent locomotion to a disabled animal. The animal actively contributes to its locomotion by moving its front legs, essentially pulling its rear portion behind it.

Similarly, animal strollers are well known in the art. See, e.g., U.S. Pat. No. 9,215,859, "Pet Stroller with Latchable Canopy Bar" (Dec. 22, 2015), issued to Jakubowski. These devices are very similar to strollers for human children, with some modifications to accommodate the anatomy of a dog or a cat. In these devices, the animal is placed within the stroller and moved about by a human operator. The animal does not actively contribute to its locomotion. Animal strollers are not used exclusively for disabled animals, but they do allow disabled animals to be transported from location to location by human operators.

While each of the aforementioned devices serves a function, neither combines the function of the other. That is, animal wheelchairs do not provide a means for a disabled animal to be transported once the animal becomes tired or otherwise unable to self-propel itself. Likewise, animal strollers do not provide a means for a disabled animal to self-propel.

It is therefore shown that an improved device is needed to combine the functions of an animal wheelchair with an animal stroller.

Thus, it is an object of the present invention is to provide a device that combines the functions of an animal wheelchair with an animal stroller.

It is a further object of the present invention to provide a device that can easily switch modes between providing animal wheelchair functionality and providing animal stroller functionality.

It is yet a further object of the present invention to provide a device that is optimized to be used over different types of terrain in different environments.

It is yet a further object of the present invention to provide a device that may be accessorized by animal and user friendly components.

Other objects of the present invention will be readily apparent from the description that follows.

SUMMARY

The present invention is an animal mobility device to be used with an animal which lacks full functional use of its rear legs. The device provides the animal with two modes of operation, active mode and passive mode. Active mode allows the animal to propel itself by its front legs while having its rear portion supported by the device. Passive mode allows a human to propel the device while the entirety of the animal is supported by the device. The device thus acts as both a traditional "animal wheelchair" and as an "animal stroller".

One embodiment of the present invention comprises a frame, an animal engagement mechanism for securing the device to the animal when the device is in active mode, a first animal support component to support the rear portion of the animal when the device is in active mode, a second animal support component to support the entirety of the animal when the device is in passive mode, and first and second mobility components to move the device over a surface, such as the ground, a pathway, a driveway, a sidewalk, a lawn, or a floor. The mobility components may be wheels, casters, skis, or the like, depending on the environment of the intended use of the device. The device is readily toggled between active mode and passive mode merely by tilting the device. Various accessories, such as a removable full body cushion, a sunshade, or an extendable handle may be included with the device.

It is to be understood that the foregoing and following description of the invention is intended to be illustrative and exemplary rather than restrictive of the invention as claimed. These and other aspects, advantages, and features of the invention will become apparent to those skilled in the art after review of the entire specification, accompanying figures, and claims incorporated herein.

DETAILED DESCRIPTION OF THE INVENTION

Figure 1:
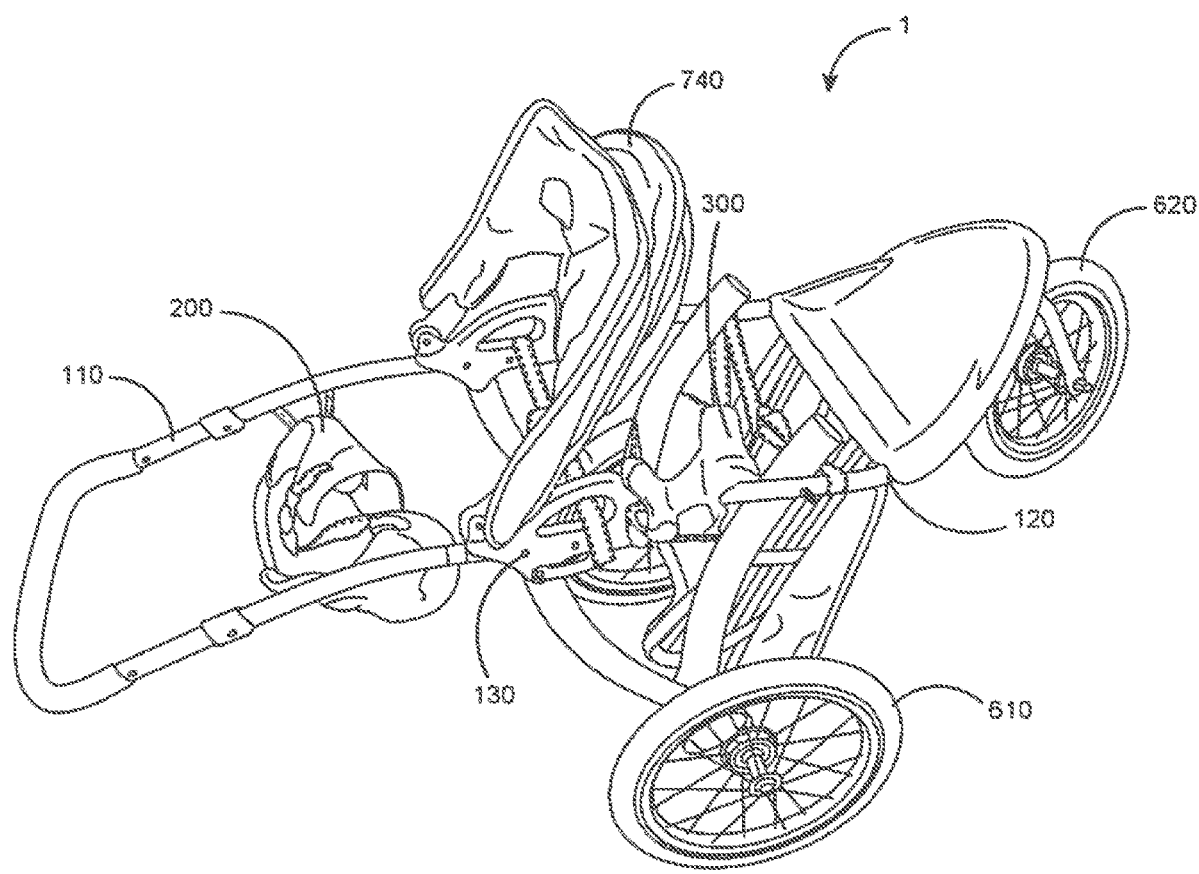
FIG. 1 is a perspective side view of one embodiment of the device in active mode.

One embodiment of the present invention is an animal mobility device 1 for use with an animal 10. The animal 10 typically will be a dog, though other animals 10, such as miniature horses, potbellied pigs, and large cats, may also use the device 1. As contemplated, the device 1 is designed to work with an animal 10 having at least one healthy front leg 12, and preferably two healthy front legs 12. An animal 10 uses the device 1 because one or both of its hind legs are not healthy, or may have been amputated.

Figure 2:
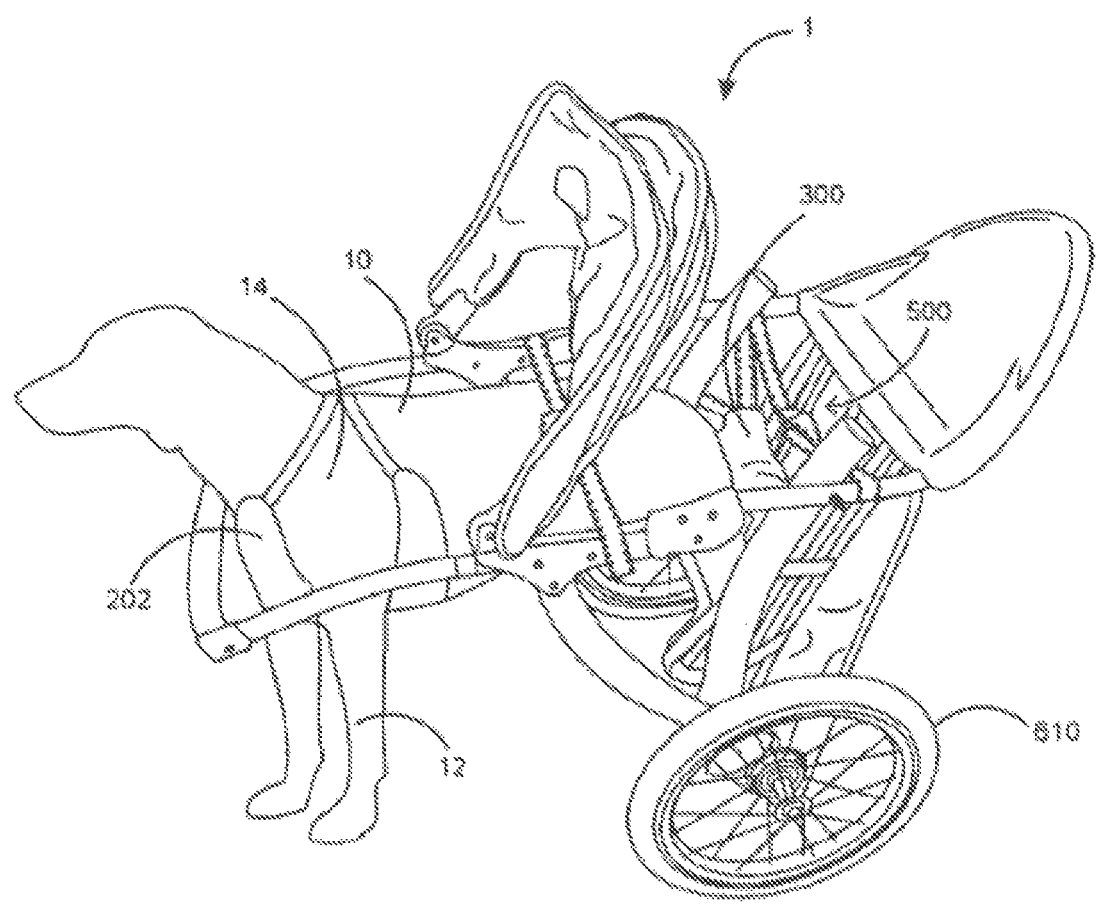
FIG. 2 is a perspective side view of the embodiment of the device shown in FIG. 1, depicting an animal using the device in active mode.
Figure 6:
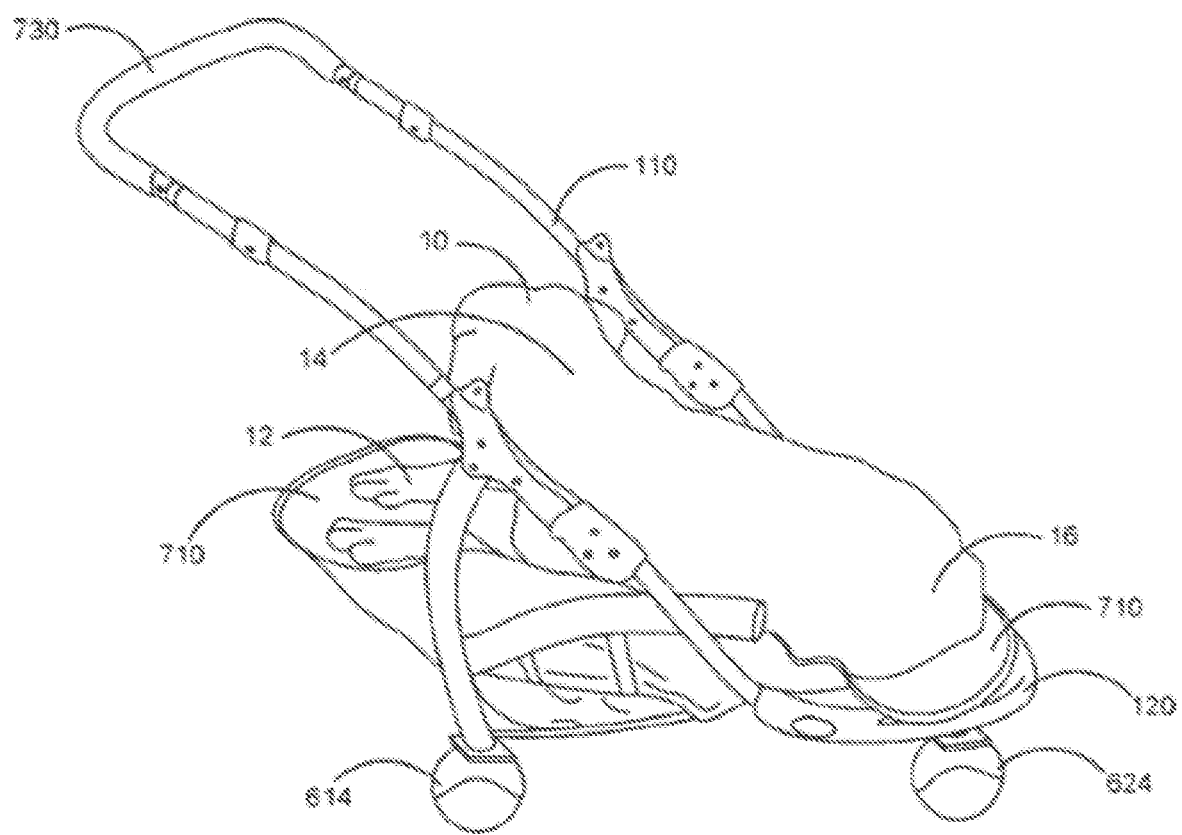
FIG. 6 is a perspective side view of another embodiment of the device, wherein the mobility components are comprised of casters, depicting an animal using the device in passive mode.
Figure 9:
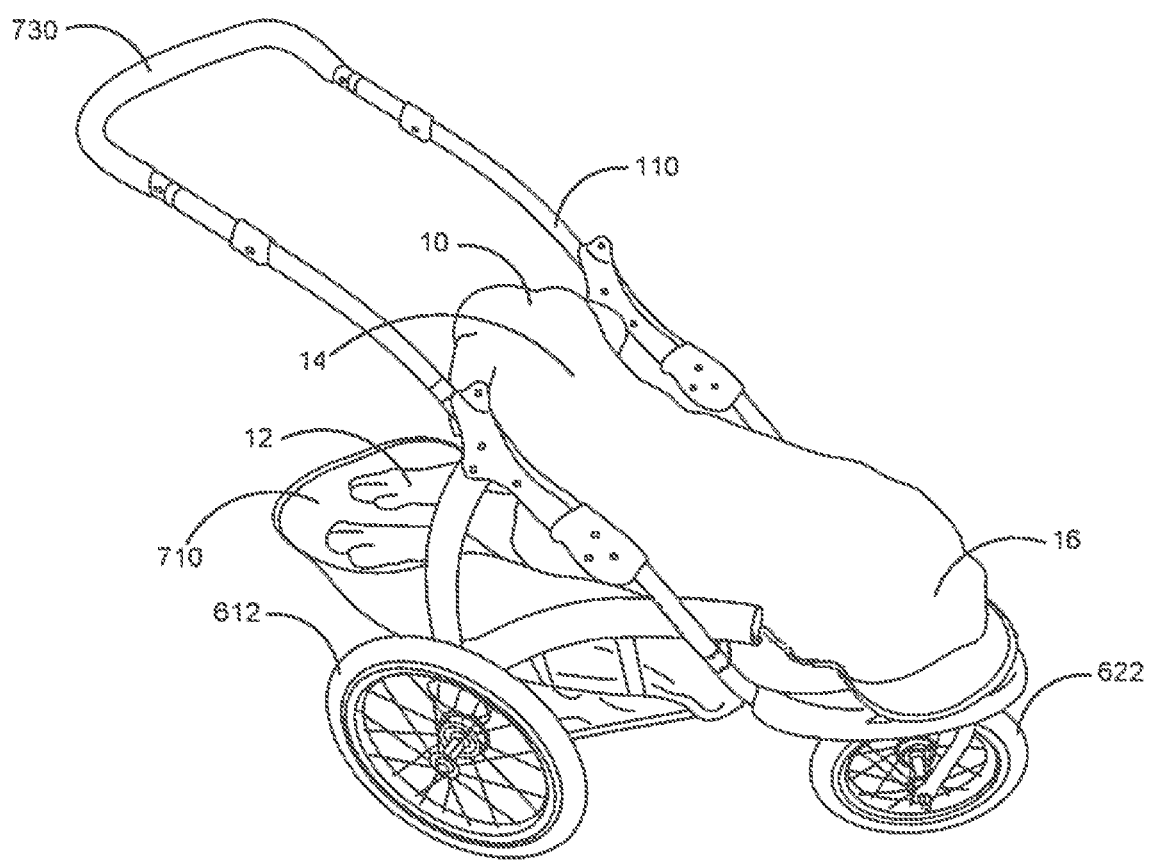
FIG. 9 is a perspective side view of an alternative embodiment of the device shown in FIG. 6, wherein the mobility components are comprised of wheels, depicting an animal using the device in passive mode.

The animal mobility device 1 of the present invention comprises a frame 100, an animal engagement mechanism 200, a first animal support component 300, a second animal support component 400, a first mobility component 610, and a second mobility component 620. See FIG. 1. The device 1 further has an active mode, and a passive mode, whereby the device 1 is in active mode when the animal 10 provides the means of locomotion of the device 1, see FIG. 2, and the device 1 is in passive mode when the animal 10 does not provide the means of locomotion of the device 1, see FIGS. 6 and 9.

The frame 100 of the device 1 is substantially rigid. It may be made from aluminum, plastic, composites, other metals, or a combination of same. The frame 100 is best understood to be light weight and durable; thus, any material suitable to these purposes is contemplated. The frame 100 has a first portion 110 and a second portion 120. The first portion 110 is connected to the second portion 120 at a connection point 130. During use, the first portion 110 of the frame 100 is oriented at an angle to the second portion 120. This angle may be any angle between one hundred and one hundred seventy degrees, with this angle defining the relationship between the portions of the frame 100 when viewed from above (similarly, when viewed from below, the first portion 110 of the frame 100 is at an angle to the second portion 120 of the frame 100 of between one hundred ninety and two hundred fifty degrees). The first portion 110 of the frame 100 is primarily intended to engage with the animal 10 when the device 1 is in active mode, and the second portion 120 of the frame 100 is primarily intended to engage with the animal 10 when the device 1 is in passive mode. At least some portions of the frame 100 may contain padding 140, such as foam, to protect the animal 10. In one embodiment, the frame 100 may be folded when not in use, such that the angle between the first portion 110 of the frame 100 and the second portion 120 of the frame 100 is changed.

In one embodiment, the first portion 110 of the frame 100 comprises a pair of elongate members, spaced apart and oriented substantially parallel to each other. They may be joined by one or more cross members. The elongate members and the one or more cross members may be secured to each other by mechanical fasteners, or welds, or any other suitable means. While the elongate members and one or more cross members may be substantially straight, they may also have some curvature to them. Similarly, the second portion 120 of the frame 100 may be similarly constructed. The connection point 130 of the frame 100 may be at the proximate ends of the first and second portions 110, 120 of the frame 100, or at another location. In one embodiment, the connection point 130 of the frame 100 is located where the proximate end of the first portion 110 of the frame 100 connects to the second portion 120 of the frame 100 at a point between the proximate and distal ends of the second portion 120 of the frame 100. See FIG. 1.

The animal engagement mechanism 200 of the device 1 is located on the first portion 110 of the frame 100. The animal engagement mechanism 200 is configured to engage with the front portion 14 of the animal 10 when the device 1 is in active mode. The animal engagement mechanism 200 is positioned closer to the distal end of the first portion 110 of the frame 100 than to the proximate end (that is, further from the connection point 130 of the frame 100). This allows the length of the animal's 10 torso to extend rearward from the animal engagement mechanism 200 towards the second portion 120 of the frame 100. See FIG. 1.

In one embodiment, the animal engagement mechanism 200 is a harness 202 configured to be placed onto the front portion 14 of the animal 10. The harness 202 may be secured by buckles, snaps, or any other means known in the art to secure a harness 202 to an animal 10. Preferably, a portion of the harness 202 will be placed over the animal's 10 back and other portions will be placed across the animal's 10 chest, with other portions of the harness 202 placed behind the front legs 12 of the animal 10. The harness 202 is attached to the first portion 110 of the frame 100 by any known means, such as straps, buckles, mechanical fasteners, and the like. In one embodiment the harness 202 is permanently affixed to the first portion 110 of the frame 100. In the preferred embodiment the harness 202 is removably attached to the first portion 110 of the frame 100. In another embodiment, the animal engagement mechanism 200 is a collar configured to be placed around the animal's 10 neck. The collar is attached to the first portion 110 of the frame 100 in the same manner as described for the harness 202. In yet another embodiment, the animal engagement mechanism 200 is a rigid yoke configured to be placed over the animal's 10 front shoulders. A strap running under the torso of the animal 10 may or may not be used with the yoke. Other configurations of the animal engagement mechanism 200 are also contemplated.

Figure 3:
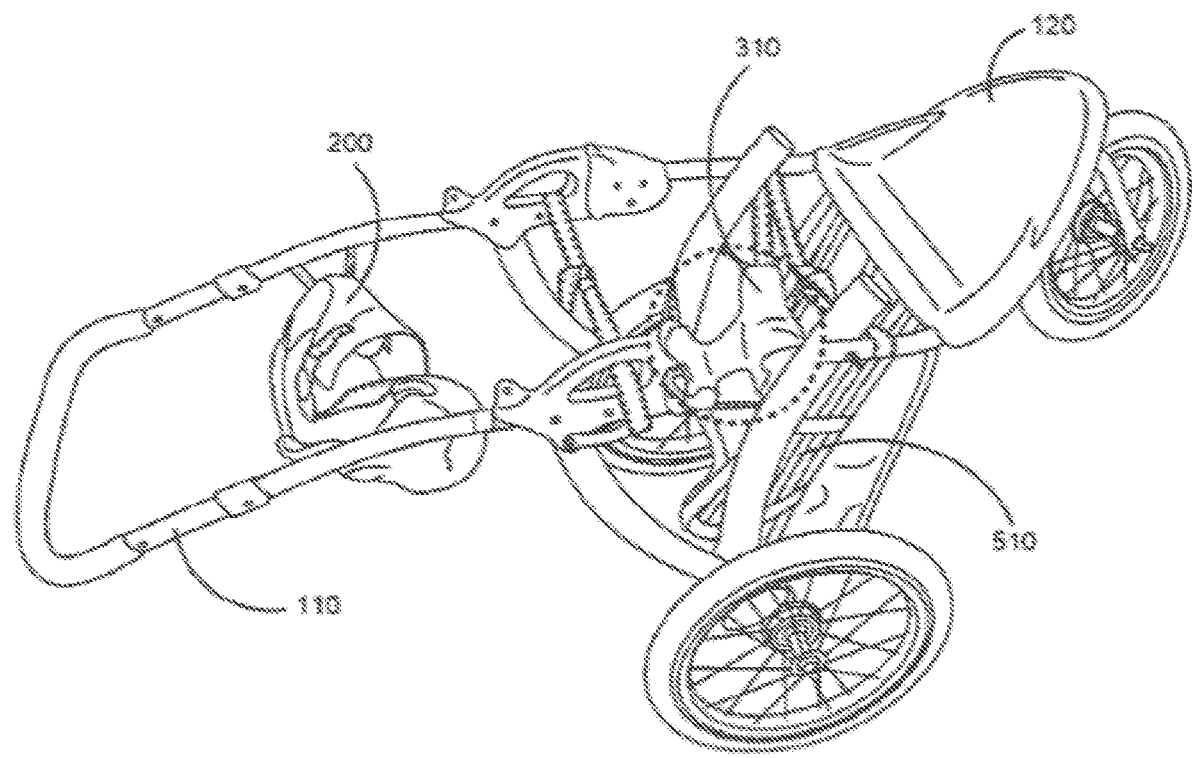
FIG. 3 is a perspective side view of the embodiment of the device shown in FIG. 1, with a portion of the frame cut away to depict additional detail.

The first animal support component 300 of the device 1 is configured to support the rear portion 16 of the animal 10 when the device 1 is in active mode. The first animal support component 300 is located on the frame 100 proximate to the connection point 130 of the frame 100. In one embodiment, the first animal support component 300 comprises a sling 310 attached to the first portion 110 of the frame 100. See FIG. 3. The sling 310 is configured to be placed underneath the rear portion 16 of the animal 10, such that the rear portion 16 of the animal 10 and the rear legs of the animal 10 (if any) are supported off the ground. The sling 310 may be attached to the first portion 110 of the frame 100 by a plurality of straps. It may also be attached by other known means, such as buckles, mechanical fasteners, and the like. In one embodiment the sling 310 is permanently affixed to the first portion 110 of the frame 100. In the preferred embodiment the sling 310 is removably attached to the first portion 110 of the frame 100. The sling 310 should be flexible and may be padded.

In another embodiment, the first animal support component 300 is a harness. The harness is configured to be placed onto the rear portion 16 of the animal 10. Preferably, a portion of the harness will be placed over the animal's 10 back and other portions will be placed across the underside of the animal's 10 torso. The harness is attached to the first portion 110 of the frame 100 by any known means, such as straps, buckles, mechanical fasteners, and the like. In one embodiment the harness is permanently affixed to the first portion 110 of the frame 100. In the preferred embodiment the harness is removably attached to the first portion 110 of the frame 100.

In yet another embodiment, the first animal support component 300 comprises a substantially rigid platform connected to the second portion 120 of the frame 100. The platform is configured to be placed underneath the rear portion 16 of the animal 10. The platform is preferably attached to the second portion 120 of the frame 100 by mechanical fasteners. In one embodiment the platform may be slideably attached to the second portion 120 of the frame 100, whereby the platform may be positioned at different points along the second portion 120 of the frame 100. In yet another embodiment, the platform has a fixed component and a moveable component, whereby the fixed component of the platform is fixedly attached to the second portion 120 of the frame 100 and the moveable component of the platform is slideably attached to the second portion 120 of the frame 100. The platform may be constructed of any suitable material, such as plastic, wood, aluminum, composites, other metals, and the like. In one embodiment, the platform is padded.

The device 1 may further comprise a rear leg retaining component 500. The rear leg retaining component 500 is configured to retain at least one rear leg of the animal 10, to prevent that leg or legs from dragging on the ground. The rear leg retaining component 500 is positioned posterior to the first animal support component 300 and attached to the frame 100. In one embodiment, the rear leg retaining component 500 is comprised of a latticework of straps 510. The latticework of straps 510 is affixed to the second portion 120 of the frame 100 and has a plurality of gaps formed between the individual straps. The latticework of straps 510 is configured to retain at least one rear leg of the animal 10 within one of the plurality of gaps of the latticework of straps 510. See FIG. 3. In another embodiment, the rear leg retaining component 500 is comprised of a pair of pouches. Each pouch is configured to retain a rear leg of the animal 10.

Figure 5:
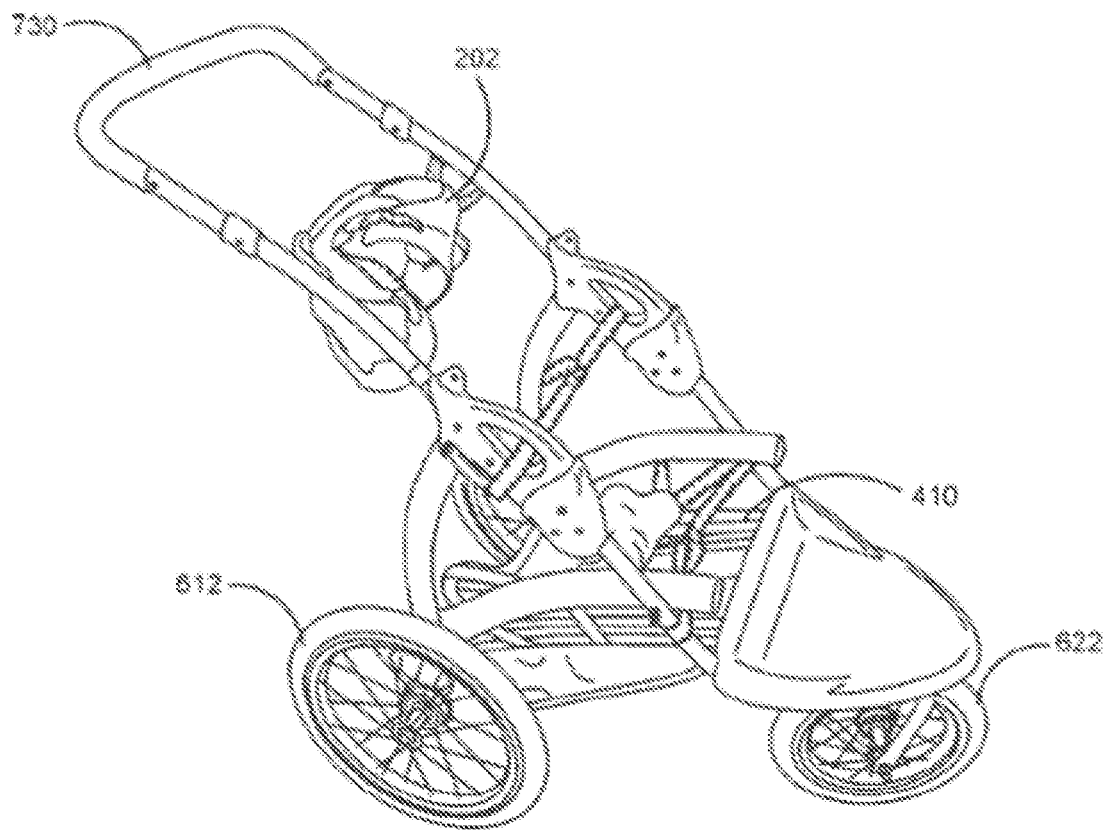
FIG. 5 is a perspective side view of one embodiment of the device in passive mode.
Figure 7:
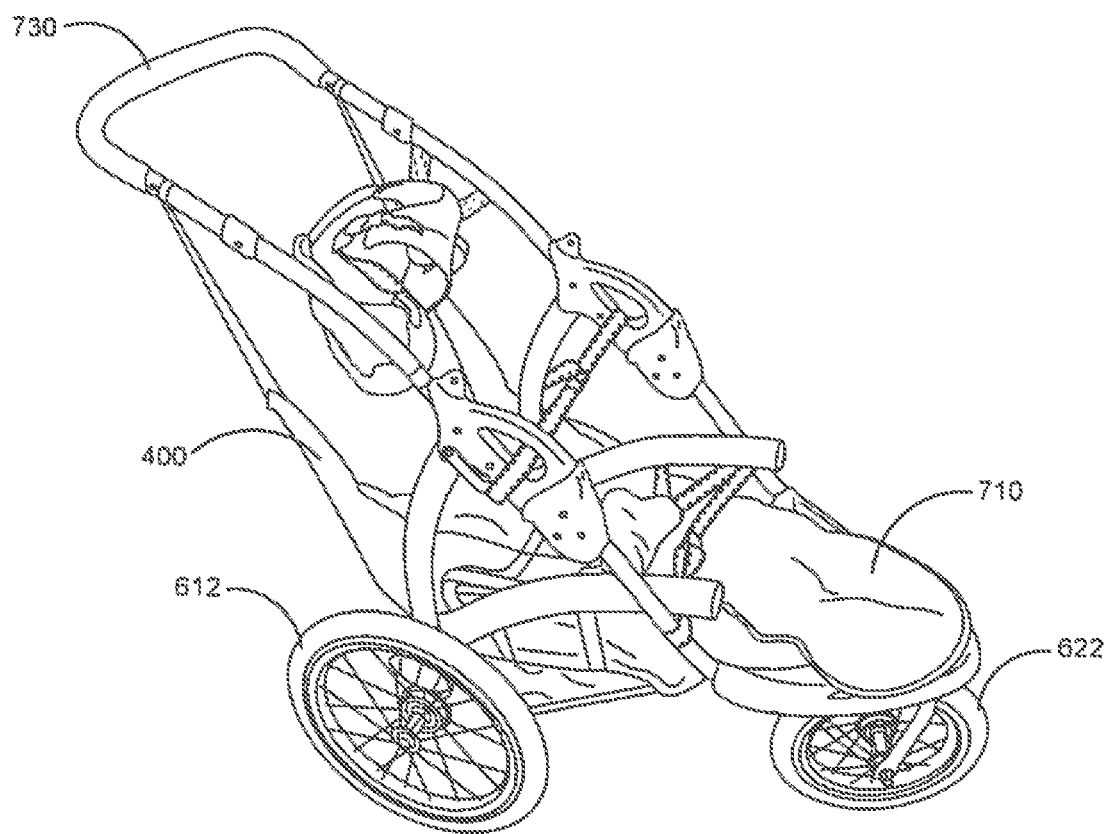
FIG. 7 is a perspective side view of the embodiment of the device shown in FIG. 5, in passive mode, depicting additional detail.
Figure 8:
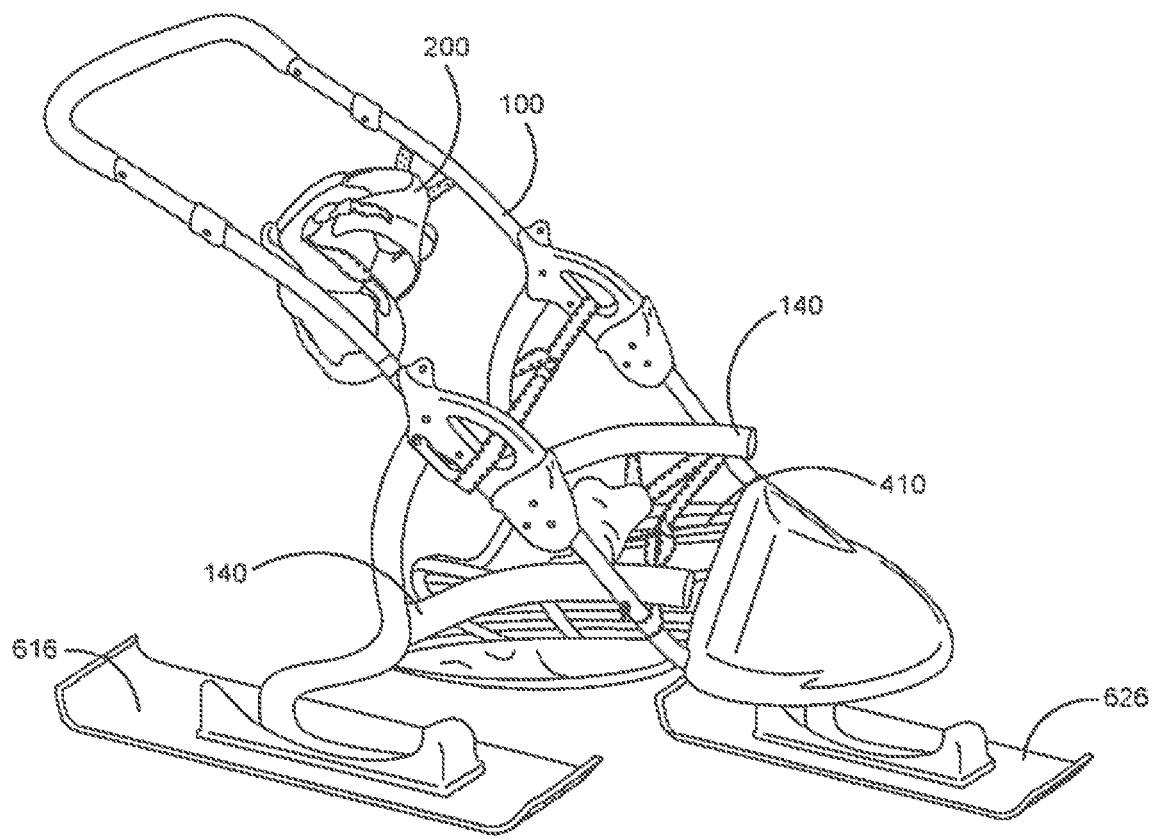
FIG. 8 is a perspective side view of an alternate embodiment of the device, having skis for the mobility components, in passive mode.

The second animal support component 400 of the device 1 is configured to support substantially the entire animal 10 when the device 1 is in passive mode. The second animal support component 400 is located on the second portion 120 of the frame 100. In one embodiment the second animal support component 400 is comprised of a plurality of straps 410 connected to the second portion 120 of the frame 100. See FIGS. 5 and 8. The straps 410 are oriented substantially perpendicular to the longitudinal axis of the second portion 120 of the frame 100. Optionally, there may be additional straps 410 oriented perpendicular to the longitudinal axis of the frame 100, such that the straps form a latticework. In one embodiment, the latticework of straps 510 acts as the second animal support component 400 when the device 1 is in passive mode and acts as the rear leg retaining component 500 when the device 1 is in active mode, as described above. In one variant, the second animal support component 400 further comprises a substantially rigid platform connected to the plurality of straps 410. In yet another variant, the second animal support component 400 further comprises a sling connected to the plurality of straps 410. In another embodiment of the second animal support component 400, a rigid platform is directly connected to the second portion 120 of the frame 100. In this embodiment, the platform may be fixedly attached to the second portion 120 of the frame 100 or slideably connected to the second portion 120 of the frame 100. In yet another embodiment, the platform has a fixed component and a moveable component, whereby the fixed component of the platform is fixedly attached to the second portion 120 of the frame 100 and the moveable component of the platform is slideably attached to the second portion 120 of the frame 100. The platform may be constructed of any suitable material, such as plastic, wood, aluminum, composites, other metals, and the like. In one embodiment, the platform is padded. In yet another embodiment, the second animal support component 400 is comprised of a sling directly connected to the second portion 120 of the frame 100. See FIG. 7. The sling is configured to be placed underneath the entire animal 10, such that the entire animal 10 is supported off the ground. The sling may be attached to the first portion 110 of the frame 100 by a plurality of straps 410. The sling should be flexible and may be padded.

The first mobility component 610 of the device 1 is attached to the frame 100 proximate to the connection point 130 of the frame 100. The first mobility component 610 is configured to facilitate movement of the device 1 along a surface, such as the ground or the floor of a structure. The second mobility component 620 of the device 1 is attached to the second portion 120 of the frame 100 at the distal end of the second portion 120 of the frame 100. The second mobility component 620 is likewise configured to facilitate movement of the device 1 along the surface. When in active mode, only the first mobility component 610 is on contact with the surface. When in passive mode, both the first mobility component 610 and the second mobility component 620 are in contact with the surface.

In the preferred embodiment, the first mobility component 610 comprises at least two wheels 612. See FIG. 1. Similarly, the second mobility component 620 comprises at least one wheel 622. See FIG. 1. The wheels 612 of the first mobility component 610 may be directly attached to the frame 100 of the device 1, or they may be attached to extensions which depend downward from the frame 100 of the device 1. The extensions, if used, may optionally be foldable, for when the device 1 is not being used. The wheels 612 of the first mobility component 610 may be joined together by an axle, or may be independently joined to the frame 100 (or the extensions, if present). One or more locking mechanisms may be associated with the wheels 612 of the first mobility component 610, to prevent them from rolling when desired. The wheels 612 of the first mobility component 610 may be the same size as the one or more wheels 622 of the second mobility component 620, or they may be of different sizes. In the preferred embodiment, a single wheel 622 of the second mobility component 620 is smaller than the wheels 612 of the first mobility component 610.

In another embodiment, the first mobility component 610 comprises at least two casters 614. See FIG. 6. Similarly, the second mobility component 620 comprises at least one caster 624. See FIG. 6. The casters 614 of the first mobility component 610 may be directly attached to the frame 100 of the device 1, or they may be attached to extensions which depend downward from the frame 100 of the device 1, as described above. One or more locking mechanisms may be associated with the casters 614 of the first mobility component 610. The casters 614 of the first mobility component 610 should be the same size as the one or more casters 624 of the second mobility component 620. Casters 614, 624 are a preferred embodiment if the device 1 is to be used primarily in an indoor setting, as it allows for greater maneuverability of the device 1 by the animal 10 over a relatively smoother surface, though casters 614, 624 can also be used in an outdoor setting.

Figure 4:
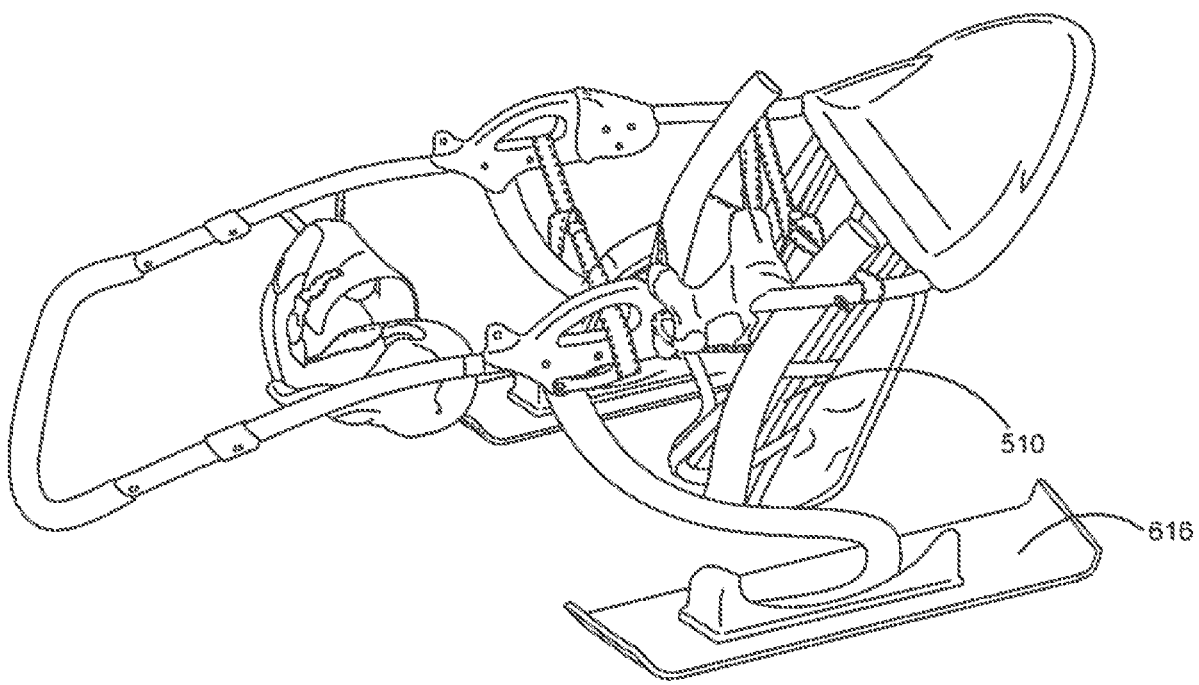
FIG. 4 is a perspective side view of an alternate embodiment of the device, in active mode, having skis for the mobility components.

In yet another embodiment, the first mobility component 610 comprises at least two skis 616. See FIG. 4. Similarly, the second mobility component 620 comprises at least one ski 626. See FIG. 8. The skis 616 of the first mobility component 610 may be directly attached to the frame 100 of the device 1, or they may be attached to extensions which depend downward from the frame 100 of the device 1, as described above. Skis 616, 626 are a preferred embodiment if the device 1 is to be used in an outdoor winter setting, over snow or ice.

The device 1 of the present invention may further comprise various optional accessories. In one embodiment, the second animal support component 400 further comprises a removable full body cushion 710. See FIG. 7. The full body cushion 710 is configured to be placed on top of the second animal support component 400 and beneath the animal 10. Preferably, the full body cushion 710 is removably attached to the second portion 120 of the frame 100 by straps, buckles, snaps, other types of mechanical fasteners, and the like. The full body cushion 710 should be washable. Another optional accessory is a sunshade 740. See FIG. 1. The sunshade 740 is movably attached to the frame 100 of the device 1, and is positionable to protect the animal 10 from the sun or rain. Yet another optional accessory is a handle 730. See FIG. 5. The handle 730 is attached to the frame 100 and assists the user with moving the device 1 when the device 1 is in passive mode. The handle 730 may be adjustable, to accommodate users of varying height, for example, by telescoping means. The handle 730 may also be foldable for storage purposes.

Turning to the two modes of use of the device 1, the device 1 is in active mode when locomotion occurs primarily through the activities of the animal 10, and the device 1 is in passive mode when locomotion of the device 1 does not involve any activity on the part of the animal 10. Active mode is characterized by the first portion 110 of the frame 100 being oriented substantially horizontally, and the second portion 120 of the frame 100 is oriented upwardly. The first mobility component 610 is in contact with the surface, while the second mobility component 620 is not in contact with the surface. The animal engagement mechanism 200 is engaged with the front portion 14 of the animal 10, and the first animal support component 300 supports the rear portion 16 of the animal 10. The front legs 12 of the animal 10 are in contact with the surface and the animal 10 can propel the device 1 my moving its front legs 12. See FIGS. 1 through 4. Passive mode is characterized by the second portion 120 of the frame 100 being oriented substantially horizontally, and the first portion 110 of the frame 100 is oriented upwardly. Both the first mobility component 610 and the second mobility component 620 are in contact with the surface. The second animal support component 400 supports substantially the entirety of the animal 10. None of the legs of the animal 10 is in contact with the surface and a user propels the device 1 while the animal 10 rests thereon. See FIGS. 5 through 9. The device 1 is easily toggled between active mode and passive mode merely by tipping the device 1 to orient either the first portion 110 of the frame 100 or the second portion 120 of the frame 100 substantially horizontally. The first mobility component 610 acts as a fulcrum for this tipping action. (Note that if the animal 10 is not engaged by the animal engagement mechanism 200 the first portion 110 of the frame 100 will not remain in a horizontal orientation on its own.) In one embodiment the device 1 further comprises a counterweight located on the first portion 110 of the frame 100; this counterweight is configured to at least partially balance the second portion 120 of the frame 100 when the device 1 is in active mode, to avoid the animal 10 being lifted off the ground by the weight of the second portion 120 of the frame 100.

In one embodiment, the animal 10 must be removed from the animal engagement mechanism 200 and reversed when the device 1 is toggled from active mode to passive mode. In another embodiment in which the second animal support component 400 comprises a slideable platform, the animal 10 need not be reversed, but rather the rear portion 16 of the animal 10 is placed on the slideable portion of the platform and moved rearward along the second portion 120 of the frame 100.

Modifications and variations can be made to the disclosed embodiments of the present invention without departing from the subject or spirit of the invention.

I claim:

1. An animal mobility device adapted for use with an animal having front legs, a front portion, and a rear portion, said device comprising
   a frame,
      said frame being substantially rigid and having a first portion and a second portion, with the first portion connected to the second portion at a connection point, said first portion oriented at an angle of between one hundred and one hundred seventy degrees to said second portion;
   an animal engagement mechanism,
      said animal engagement mechanism located on the first portion of the frame, said animal engagement mechanism configured to engage with the front portion of the animal;
   a first animal support component,
      said first animal support component located on the frame proximate to the connection point, said first animal support component configured to support the rear portion of the animal;
   a second animal support component,
      said second animal support component located on the second portion of the frame,
      said second animal support component configured to support substantially the entirety of the animal;
   a first mobility component,
      said first mobility component attached to the frame proximate to the connection point of the frame, said first mobility component configured to facilitate movement of the device along a surface; and
   a second mobility component,
      said second mobility component attached to the second portion of the frame, said second mobility component configured to facilitate movement of the device along the surface;
   wherein said device has an active mode and a passive mode,
   whereby the device is in active mode when the first portion of the frame is oriented substantially horizontally, the first mobility component is in contact with the surface, the second mobility component is not in contact with the surface, the animal engagement mechanism is engaged with the front portion of the animal, the first animal support component is supporting the rear portion of the animal, and the front legs of the animal are in contact with the surface, and
   the device is in passive mode when the second portion of the frame is oriented substantially horizontally, the first mobility component is in contact with a surface, the second mobility component is in contact with the surface, and the second animal support component supports substantially the entirety of the animal.

2. The device of claim 1 wherein at least a portion of the frame is padded.

3. The device of claim 1 wherein the animal engagement mechanism is a harness configured to be placed onto the front portion of the animal, said harness attached to the first portion of the frame.

4. The device of claim 1 wherein the animal engagement mechanism is a collar configured to be placed onto the front portion of the animal, said collar attached to the first portion of the frame.

5. The device of claim 1 wherein the first animal support component comprises a sling attached to the first portion of the frame, said sling configured to be placed underneath the rear portion of the animal.

6. The device of claim 5 wherein the sling is attached to the first portion of the frame by a plurality of straps.

7. The device of claim 1 wherein the first animal support component is a harness configured to be placed onto the rear portion of the animal, said harness attached to the first portion of the frame.

8. The device of claim 1 wherein the first animal support component comprises a substantially rigid platform connected to the second portion of the frame, said platform configured to be placed underneath the rear portion of the animal.

9. The device of claim 1 further comprising a rear leg retaining component, said rear leg retaining component configured to retain at least one rear leg of the animal, said rear leg retaining component positioned posterior to the first animal support component.

10. The device of claim 9 wherein the rear leg retaining component is comprised of a latticework of straps, said latticework of straps having a plurality of gaps formed therebetween, whereby said latticework of straps is configured to retain at least one rear leg of the animal within one of the plurality of gaps of said latticework of straps.

11. The device of claim 9 wherein the rear leg retaining component is comprised of a pair of pouches, each said pouch configured to retain a rear leg of the animal.

12. The device of claim 1 wherein the second animal support component is comprised of a plurality of straps connected to the second portion of the frame, said straps oriented substantially perpendicular to a longitudinal axis of the second portion of the frame.

13. The device of claim 12 wherein the second animal support component further comprises a substantially rigid platform connected to the plurality of straps of the second animal support component.

14. The device of claim 12 wherein the second animal support component is comprised of a sling connected to the plurality of straps of the second animal support component.

15. The device of claim 1 wherein the second animal support component is comprised of a substantially rigid platform connected to the second portion of the frame.

16. The device of claim 1 wherein the second animal support component is comprised of a substantially rigid platform slideably connected to the second portion of the frame.

17. The device of claim 1 wherein the second animal support component is comprised of a sling connected to the second portion of the frame.

18. The device of claim 1 wherein
the first mobility component comprises at least two wheels, and
the second mobility component comprises at least one wheel.

19. The device of claim 1 wherein
the first mobility component comprises at least two casters, and
the second mobility component comprises at least one caster.

20. The device of claim 1 wherein
the first mobility component comprises at least two skis, and
the second mobility component comprises at least one ski.

21. The device of claim 1 wherein the second animal support component further comprises a removable full body cushion, said full body cushion configured to be placed beneath the animal.

22. The device of claim 1 further comprising a counterweight, said counterweight located on the first portion of the frame and configured to at least partially balance the second portion of the frame when the device is in active mode.

23. The device of claim 1 further comprising a handle.

24. The device of claim 1 further comprising a sunshade.

* * * * *